United States Patent [19]
Lapeyre

[11] 3,714,657
[45] Jan. 30, 1973

[54] METHOD AND APPARATUS FOR POSITION LOCATION USING ANGLE ENCODING

[75] Inventor: James M. Lapeyre, New Orleans, La.

[73] Assignee: Laitram Corporation, New Orleans, La.

[22] Filed: June 25, 1970

[21] Appl. No.: 49,784

[52] U.S. Cl..............343/106 R, 343/5 DP, 343/11, 343/112 D, 356/152
[51] Int. Cl..............................................G01s 1/54
[58] Field of Search..343/106, 5 DP, 112 D; 356/152

[56] References Cited

UNITED STATES PATENTS 3,400,398   9/1968   Lapeyre et al.....................343/106 R
3,123,820   3/1964   Harpell......................343/5 DP UX Primary Examiner—Benjamin A. Borchelt
Assistant Examiner—Richard E. Berger
Attorney—Schiller & Pandiscio

[57] ABSTRACT

A method and apparatus for providing a position location based on transmission of substantially parallel, collimated, coherent signal beams from a reference position, the beams being rotated in fixed parallel relation to one another about the reference position. The determination of the distance of the receiving position from the reference position, or the determination of the azimuth of the receiving position from a predetermined reference direction through the reference position, or both, is determined according to incremental angular rotation of the beams independently of the angular velocity of rotation.

8 Claims, 3 Drawing Figures

JAMES M. LAPEYRE
INVENTOR.
BY
Schiller & Pandiscio
ATTORNEYS.

METHOD AND APPARATUS FOR POSITION LOCATION USING ANGLE ENCODING

A number of systems are known for location, either in distance, azimuth, or both, a position relative to another position or reference point. Typically, some such systems propose to determine azimuth by placing, at the reference point, a radio beacon from which a single directional beam of energy is rotated azimuthally at a constant rate, the rotation of the beam being timed from a reference direction. Because directional beams being timed from a reference direction. Because directional beams have some divergence, the beam angle has been a source of error, and considerable ingenuity has been devoted to determination of the location of the beam center. Other systems propose to determine distance by using a pair of spaced receiving antennae through which the directional beam sequentially sweeps in rotation. The distance of the antennae from the reference point is then a function of the time interval between the times of reception of the beam at the respective antennae. Large spacing between the antennae, or highly sensitive detectors, or both, are, therefore, indicated for use in this latter system. And, particularly, in such a system the measurement of distance is complicated by the need to adjust for changes in the angle between the line joining the antennae and the beam received by the antennae.

One way of overcoming these difficulties is described in U.S. Pat. No. 3,400,398 which provides a position locating method and means based on transmission of rotatable signals about a single reference point, reception of the signals sequentially at a remote position spaced from the reference point, and the determination of the distance of the remote position from the reference point, or the determination of the azimuth of the position from a predetermined reference direction through the reference point, or both, according to the timing between the sequential reception of selected signals. However, in order, to operate, since it is based on time, this approach requires that the signals must be rotated in azimuth at a constant angular velocity about a common center. This latter requirement introduces problems because of the inherent difficulties in achieving constancy of angular velocity of rotation.

An object of the present invention is to provide a new and improved position locating method and means.

Another object of the present invention is to provide a position locating method and means using a pair of substantially parallel, coherent, collimated rotating signal beams, by which the azimuth from a known reference direction through a reference position and the distance from the reference position to a target can be determined independently of the annular velocity of rotation of the signals.

Yet another object of the present invention is to provide a position locating method and means which can be used as a passive system or in an active system in which a transponder is used to both locate and retrieve desired information from the position to be located.

Still another object of the present invention is to provide a position locating method and means which utilizes a pair of substantially collimated parallel, coherent, rotating beams and in which the desired position is determined by measuring angular increments of rotation of the beams.

The above objects, advantages, and features of the present invention, as well as others, are accomplished in part by providing a broadcast apparatus for a position-determining system and comprising in combination, means for providing a pair of substantially collimated beams of substantially coherent electromagnetic energy, the beams being transmitted in fixed substantially parallel relation to one another and being rotatable in their parallel relation substantially in common in a plane about a common axis, and means for providing a train of signals proportional to angular increments of rotation of the beams.

More specifically, the entire position locating method and means of the present invention are accomplished by providing a system for determining a position in substantially in a plane relative to a reference point in said plane, and including a projection system disposed at said reference point for providing a pair of substantially collimated beams of substantially coherent electromagnetic energy, the beams being projected a fixed distance apart in substantially parallel relation to one another. The beams are rotatable in their parallel relation substantially in common in a horizontal plane about a common axis preferably centrally disposed between the beam sources. Means are included for providing a train of signals, typically each corresponding to an angular increment of rotation of the beams. The system also includes a receiver position in the beam plane so as to be responsive to the respective changes in beam energy received upon sequential passage of each of the beams through the receiver position, and means responsive to the signal train for providing a first count of the signals occurring during rotation of one of the beams from a predetermined reference direction to the receiver position. This first count is proportional to the azimuth of the receiver position from the predetermined reference direction through the reference point. Means are also included, responsive to the signal train, for providing a second count of signals occurring from the angular rotation of one of the beams through the receiver position to the passage of the other of the beams through the receiver position. The second count is proportional to the distance between the receiver position and the reference point.

Other objects of the invention will in part be obvious and will in part appear hereinafter. The invention accordingly comprises an apparatus and method possessing the construction, combination of elements and arrangement of parts, and the process comprising the several steps and the relation of one or more of such steps with respect to each of the others, all of which are exemplified in the following detailed disclosure and the scope of the application of which will be indicated in the claims.

For a fuller understanding of the nature and the objects of the present invention reference should be had t o the following detailed description taken in connection with the accompanying drawings wherein.

Figure 1:
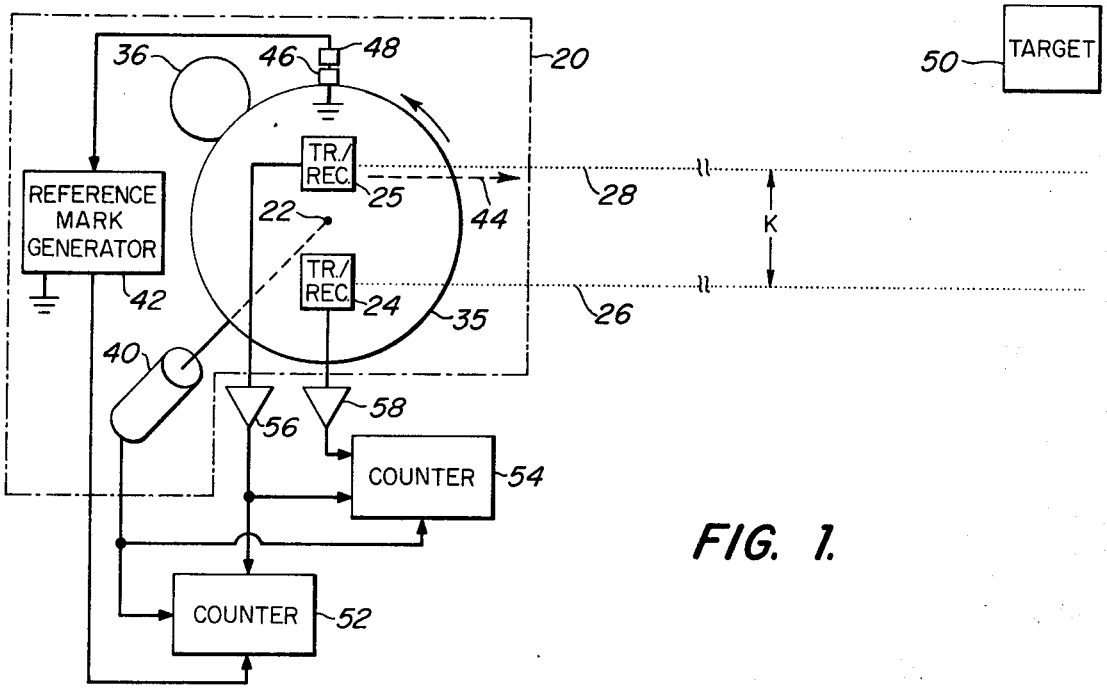
FIG. 1 shows one embodiment of a position locating method and means of the present invention.

Referring to FIG. 1 of the drawing there is shown broadcast or projection means, located within the broken line and identified by the reference numeral 20, disposed at or about a reference position or point, for example at 22. Broadcast means 20 includes first and second transmitter receivers 24 and 25 for providing a pair of collimated beams 26 and 28 of coherent electromagnetic energy. Highly collimated coherent beams typically are readily obtainable from a number of known maser and laser systems.

In a preferred embodiment transmitter-receivers 24 and 25 are indeed lasers. The term "laser" is intended to include devices in which generation and amplification of electromagnetic waves at frequencies from the infra-red region through visible and ultra-violet, occurs by stimulated emission of radiation.

As means for moving the two beams in rotation about a common center, while maintaining the requisite parallelism between the beams, the invention includes rotatable apparatus such as turntable 35, or the like, upon which the laser transmitter!-receivers 24 and 25 are mounted such that both beams 26 and 28 can be simultaneously rotated maintaining their parallel relation in azimuth about a position of reference such as 22. Transmitter-receivers 24 and 25 are preferably positioned on the turntable 35 substantially equidistant from the center of rotation of turntable 35, which is preferably located at 22. Means, shown only schematically at 36, such as a motor and appropriate gearing, are provided for rotating the turntable.

Broadcast means 20 also includes means such as encoder 40 for providing a train of signals each corresponding to an angular increment of rotation of beams 26 and 28. It should be noted that these increments, being angles, are independent of the angular velocity of rotation. Incremental shaft angle encoder 40 can be of any well known design, and is coupled to a shaft (not shown) for rotating turntable 35 so as to encode increments of rotation turn table 35 in the form of a train of signals. Such encoding can be on any desired proportionality, but is most conveniently described as being on a 1:1 basis e.g., one pulse for each second of arc.

Also provided is a reference mark generator 42 which provides a pulse upon coincidence of the beam 28 with an arbitrary predetermined reference direction indicated by dashed arrow 44. Of course, it is to be understood that the term "coincidence" also includes configurations in which beam 28 lies substantially parallel to and extends in the same direction as arrow 44, as would occur were transmitter-receiver 25 to be positioned a different distance from point 22.

To effect the pulsed output of generator 42, there is provided in the embodiment shown, a simple switch mechanism including grounded movable contact 46 mounted at a predetermined position on turntable 35 for rotation therewith, and a stationary contact 48 connected to generator 42. Contacts 46 and 48 are so located relative to one another as to be in contact and thereby complete a circuit for initiating transmission of a pulse from generator 42 only when beam 28 is in coincidence with the reference direction arrow 44. That position of coincidence is the position in which broadcast means 20 is disposed in FIGS. 1 and 4. Alternatively to effect a reference pulse, other means can be employed, such as a lamp and photocell arrangement or the like.

In addition to the broadcast means 20, FIG. 1 also includes means for locating the position of broadcast means 20 relative to a target 50 which may reflect electromagnetic energy incident thereon from means 26 and 28. Target 50 may be, for example, a ship, buoy or other body which will reflect the energy from beams 26 and 28. The position locating means of FIG. 1 comprises a pair of counters 52 and 54. Counter 52 is electrically connected to the receiving portion of transmitter-receiver 25 via amplifier 56. Also electrically connected to counter 52 are the outputs of encoder 40 and generator 42. Counter 54 is electrically connected to the receiving portions of both transmitter-receivers 24 and 25 via amplifiers 58 and 56 respectively. Also electrically connected to counter 54 is the output of encoder 40.

Figure 3:
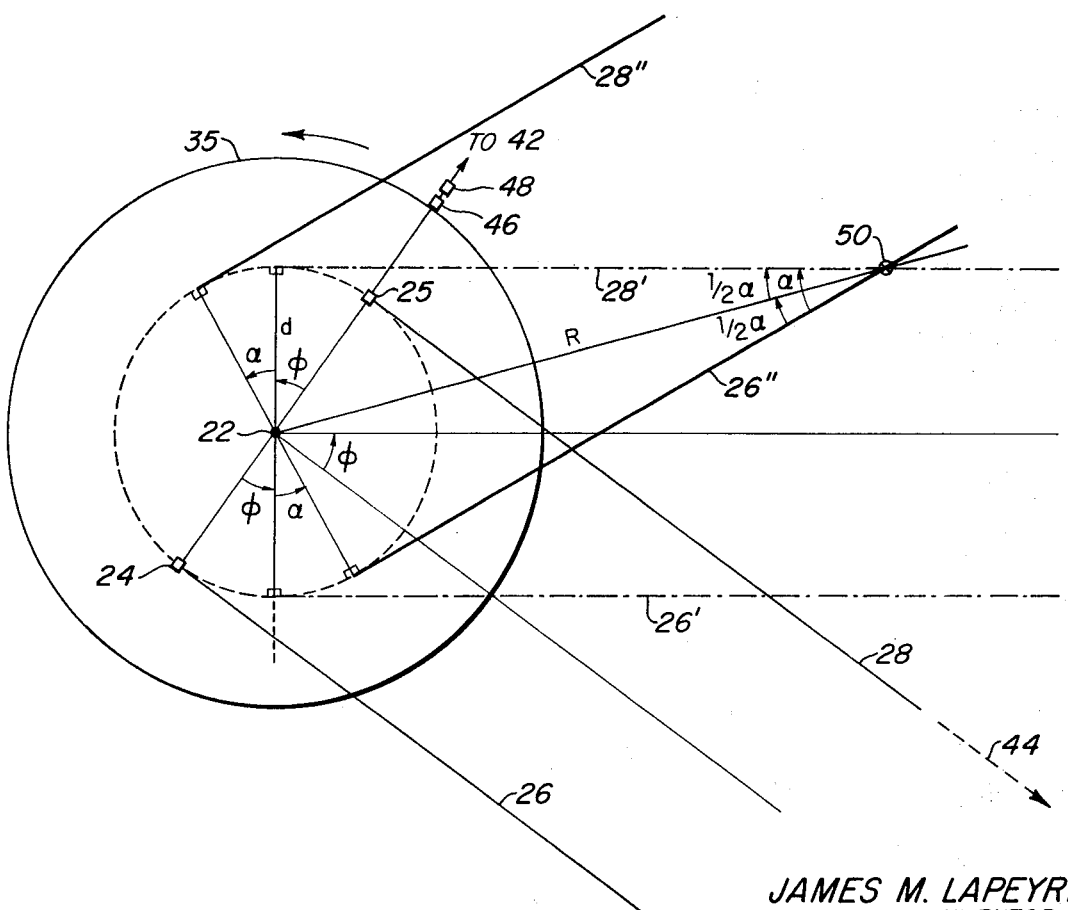
FIG. 3 is a diagram illustrating the principle of operation of the present invention.

Operation of position locating apparatus and method of FIG. 1 is as follows and will be better understood by reference to FIG. 3. Upon rotation of turntable 35 at any angular velocity, beams 26 and 28 generated by the transmitting portions of transmitter-receivers 24 and 25 respectively are rotated in parallel relation in a common plane about the axis or center of rotation at point 22. To have a location determination of the position of broadcast means 20 with respect to target 50, it is obvious that target 50 must be within the geometric confines of the sweep of azimuthally rotating beams 28 and 26. When rotating beam 28 coincides with reference direction arrow 44, contacts 46 and 48 close, thereby initiating a pulse from generator 42.

This pulse is applied to counter 52 and initiates operation thereof to begin counting the angular increments of rotation supplied by the train of pulse signals from encoder 40. As turntable 35 rotates in the direction shown, beam 28 rotates through an angle $\phi$ to a position from which beam 28 illuminates target 50 as shown by broken line 28'. Illumination of target 50 causes a reflection of the beam energy which is received by transmitter-receiver 25. This reflected energy is amplified by amplifier 56, wave-shaped if desired, and applied simultaneously to counters 52 and 54 to stop the counting operation of counter 52 and to initiate the operation of counter 54. The count thus provided by counter 52 is proportional to the azimuth of the target 50 from reference direction of arrow 44 through reference point 22. Counter 54, when initiated by the signal from the receiving portion of transmitter-receiver 25, counts the angular incremental signals from encoder 40 until beam 26 has rotated through an angle from reference direction 44 to a position where it illuminates target 50 as shown by broken line 26'. Illumination of target 50 causes a reflection of the beam energy which is received by the receiving portion of transmitter-receiver 24. This reflected energy is amplified by amplifier 58, wave-shaped if desired, and is applied to counter 54 to stop its counting operation. The count provided by counter 54 is approximately proportional to the distance from target 50 to the reference position or point 22.

The relationships provided by counters 52 and 54 are generally as follows:

$$C_{52} = K\phi \quad (1)$$

where K is a scaling factor, $C_{52}$ is the count provided by counter 52 and $\phi$ is the angle through which beam 28 traveled from reference direction 44 through point 22 until it illuminated target 50 as shown by broken line 28'.

Also, $$C_{54} \approx \alpha \quad (2)$$

$$\text{sine } \tfrac{1}{2}\alpha = d/R$$

$$R = d/\text{sine } \tfrac{1}{2}\alpha$$

where $C_{54}$ is the count provided by counter 54 and $\alpha$ is the angle turned by the turntable between illumination of target 50 by beams 28 and 26, d is the fixed distance from each of the transmitter-receivers 24 and 25 to point 22, and R is the approximate distance or range from target 50 to reference position 22.

The embodiment of the present invention shown in FIG. 1 is a passive system in that the position to be located is the location of broadcast means 20 with respect to target 50. In order that beams 26 and 28 can be reflected, target 50 of course must be reflective. Also in the embodiment of FIG. 1 the receivers for receiving the energy from beams 26 and 28 and counters 52 and 54 are located at the same location as the means 20.

Figure 2:
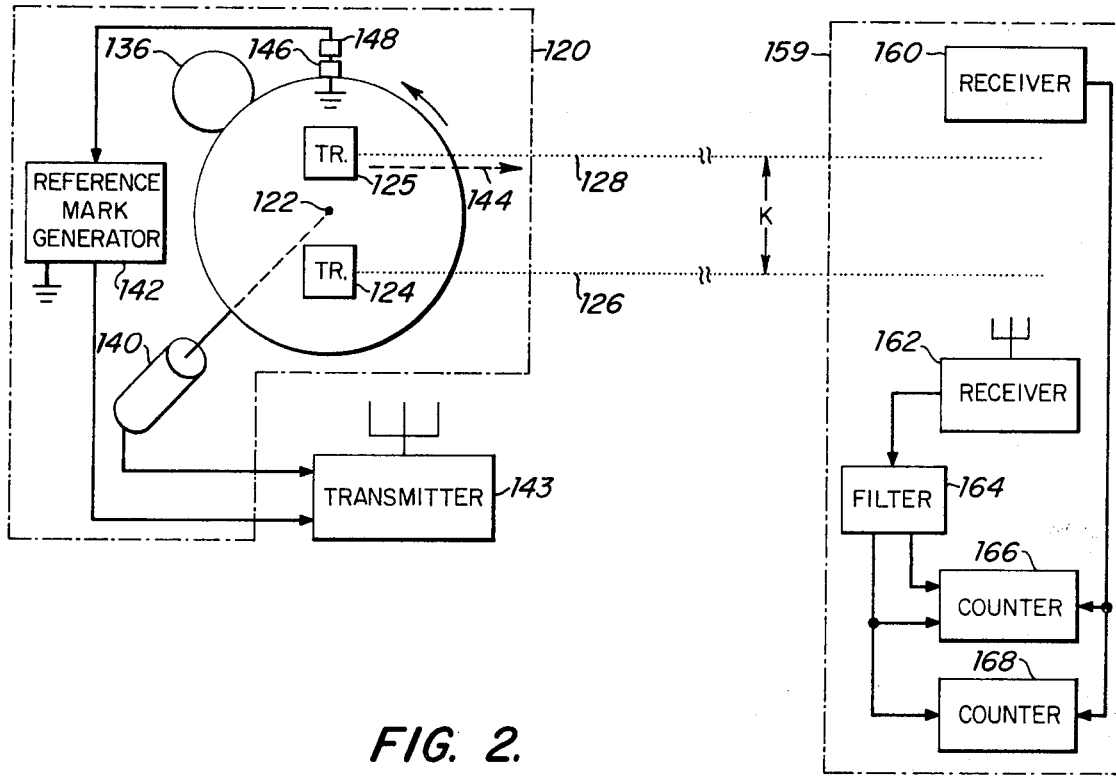
FIG. 2 shows another embodiment of a position locating method and means of the present invention.

FIG. 2 is another embodiment of the invention in which an active receiver system is rather than a passive target. In the arrangement of FIG. 2, broadcast means 120 is located at a fixed location on land or on water. The receiving means includes a receiver located at a position 159 remote from the broadcast means 120. In this configuration, it is desired to find the location of receiver position 159 with respect to the position of broadcast means 120. In broadcast means 120, only transmitters are located at the broadcast means position while the receiving means is located at receiver position 159. Therefore, broadcast means 120 includes only transmitters 124 and 125, not transmitter-receivers such as 24 and 25 in FIG. 1.

A pair of active receivers 160 and 162 are located at receiver position 159. Receiver 160 is responsive to provide an output signal when it is illuminated by beams 128 and 126, which are disposed in the same manner as beams 26 and 28 of FIG. 1 on a turntable. Receiver 162 receives information in the form of the train of pulse signals from encoder 140 and the reference marker pulse from generator 142 both of which are transmitted by transmitter 143. Filter 164 which is connected to receiver 162 is designed to separate the marker pulse and the train of pulse signals for appropriate application to counters 166 and 168 which correspond to counters 52 and 54 respectively of FIG. 1.

In the operation of the embodiment of FIG. 2 filter 164 applies the train of pulse signals from encoder 140 to counters 166 and 168. Filter 164 also applies the marking pulse transmitted when beam 128 coincides with reference direction 144 to start the counting operation of counter 166. When beam 128 illuminates receiver 160, a signal is applied from receiver 160 to stop operation of counter 166 and simultaneously start counter 168. The count on counter 166 is proportional to the azimuth of remote position 159 from predetermined reference direction 144 through reference point 122. Counter 168 counts the train of pulse signals occuring during rotation of beam 128 through receiver 160 at position 159 to the passage of beam 126 through receiver 160 at position 59. When beam 126 illuminates receiver 160, a signal is applied to counter 168 to stop its counting operation. The count on counter 168 is proportional to the distance from broadcast means 120 to remote position 159.

A number of modifications may be made to the embodiments of the present invention as shown in FIGS. 1-2. Although the embodiment shown in FIG. 1 has been described as employing transmitter-receivers 24 and 25 and FIGS. 2 and 3 have been described as employing transmitters 124 and 125 and 224 and 225 respectively in the form of lasers, other types of transmitting equipment could be used. For example, instead of employing a pair of transmitters, a single transmitter coupled with a beam splitting means could be used. In such an embodiment, a beam splitter of any one of a number of configurations, such as a knife edge prism and two plane mirrors adjustable for providing beams 26 and 28 having the requisite parallelism, could be mounted on turntable 35 with respect to a single transmitter in the form of a laser or maser. Beams 26 and 28 in the case of FIG. 1 and the corresponding beams 126 and 128 FIG. 2 are continuously radiated. However, in a number of masers, the output is intermittent and in such cases the beams would have a predetermined pulse repetition rate, $f$, which, of course, would be a number of orders of magnitude lower than the fundamental frequency of the beam energy.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A system for determining an angular position in substantially a plane relative to a reference point in said plane, and comprising in combination:

means disposed about said reference point for providing a pair of substantially collimated beams of substantially coherent electromagnetic energy, said beams being transmitted in substantially parallel relation to one another and being rotatable in said parallel relation substantially in common in a plane about a common axis;

means for providing a train of signals, each corresponding to an angular increment of rotation of said beams independently of the angular velocity of said rotation;

receiver means responsive to the respective changes in beam energy received upon passage of each of said beams through another position in said plane;

means responsive to said train for providing a first count of said signals occurring upon rotation of one of said beams from a predetermined reference direction to an angular position wherein said one of said beams is directed at said another position, said first count being substantially proportional to the azimuth of said another position from said predetermined reference direction through said reference point; and means responsive to said train for providing a second count of said signals occurring from the angular incidence of said one of said beams with said another position to the incidence of said other of said beams with said another position, said second count being substantially proportional to the distance from said another position to said reference point.

2. A system as set forth in claim 1 wherein said receiver means are disposed substantially about said reference point.

3. A system as set forth in claim 1 wherein said receiver means are disposed substantially at said another position.

4. A system for determining an angular position in substantially a plane relative to a reference point in said plane, and comprising in combination:

means disposed about said reference point for providing a pair of substantially collimated beams of substantially coherent electromagnetic energy, said beams being transmitted in substantially parallel relation to one another and being rotatable in said parallel relation substantially in common in a plane about a common axis;

means for rotating said beams in said relation;

means for providing during rotation an omni-directional broadcast pulse of radiation at coincidence of a predetermined one of said beams with an arbitrary reference direction in said plane radial from said direction;

means for providing a train of signals each corresponding to an angular increment of rotation of said beam independently of the angular velocity of said location, said means being an incremental shaft encoder connected to said rotation means;

receiver means responsive to the respective changes in beam energy received upon passage of each of said beams through another position in said plane;

first counting means responsive to said train and said pulse for providing a first count of said signals occurring upon rotation of one of said beams from said reference direction to an angular position wherein said one of said beams is directed at said another position, said first count being substantially proportional to the azimuth of said another position from said predetermined reference direction through said reference point; and second counting means responsive to said train for providing a second count of said signals occurring from the angular incidence of said one of said signals occurring from the angular incidence of said one of said means with said another position to the incidence of said other of said beams with said another position, said second count being substantially proportional to the distance from said another position to said reference point.

5. A system as set forth in claim 4 wherein said receiver means are disposed substantially about said reference point, and said first and second counting means are physically electrically connected to said receiver means.

6. A system as set forth in claim 4 wherein said receiver means are disposed substantially at said another position which is remote from said reference point;

said first and second counting means are physically electrically connected to said receiver means;

means are provided for transmitting said train of signals and said pulse from said reference point to said receiver means at said another position; and means coupled to said first and second counting means are provided at said another position for receiving and responding to said signals and said pulse so as to operate said counting means.

7. A method for determining an angular position in substantially a plane relative to a reference point in said plane, said method comprising the steps of:

providing substantially about said reference point a pair of substantially collimated beams of substantially coherent electromagnetic energy, said beams being transmitted in substantially parallel relation to one another and being rotatable in said parallel relation substantially in common in a plane about a common axis;

providing a train of signals, each corresponding to an angular increment of rotation of said beam independently of the angular velocity of said rotation;

receiving respective changes in beam energy received upon passage of each of said beams through another position in said plane;

providing a first count of said signals occurring upon rotation of one of said beams from a predetermined reference direction to an angular position wherein said one of said beams is directed at said another position, said first count being substantially proportional to the azimuth of said another position from said predetermined reference direction through said reference point; and providing a second count of said signals occurring from the angular incidence of said one of said beams with said another position to the incidence of said other of said beams with said another position, said second count being substantially proportional to the distance from said another position to said reference point.

8. A method for determining an angular position in substantially a plane relative to a reference point in said plane, said method comprising the steps of:

transmitting about said reference point a pair of substantially collimated beams of substantially coherent electro-magnetic energy, said beams being transmitted in substantially parallel relation to one another and being rotatable in said parallel relation substantially in common in a plane about a common axis;

rotating said beams in said relation;

providing an omni-directional broadcast pulse of radiation at coincidence of a predetermined one of said beams with an arbitrary reference direction in said plane radial from said direction;

providing a train of signals each corresponding to an angular increment of rotation of said beam independently of the angular velocity of said location;

receiving respective changes in beam energy received upon passage of each of said beams through another position in said plane;

providing a first count of said train of signals occurring upon rotation of one of said beams from said reference direction to an angular position wherein said one of said beams is directed at said another position, said first count being substantially proportional to the azimuth of said another position from said predetermined reference direction through said reference point; and providing a second count of said signals occurring from the angular incidence of said one of said beams with said another position to the incidence of said other of said beams with said another position, said second count being substantially proportional to the distance from said another position to said reference point.

* * * * *